US012106710B2

(12) United States Patent
Liu

(10) Patent No.: US 12,106,710 B2
(45) Date of Patent: Oct. 1, 2024

(54) COMPENSATION CIRCUIT AND DRIVING CIRCUIT OF LIGHT-EMITTING ELEMENTS, AND LED DISPLAY DEVICE

(71) Applicant: Xiamen Extremely PQ Display Technology Co., Ltd., Xiamen (CN)

(72) Inventor: Tung-Kai Liu, Xiamen (CN)

(73) Assignee: Xiamen Extremely PQ Display Technology Co., Ltd., Xiamen (CN)

(*) Notice: Subject to any disclaimer, the term of this patent is extended or adjusted under 35 U.S.C. 154(b) by 0 days.

(21) Appl. No.: 18/395,639

(22) Filed: Dec. 25, 2023

(65) Prior Publication Data

US 2024/0127747 A1 Apr. 18, 2024

Related U.S. Application Data

(63) Continuation of application No. PCT/CN2021/142055, filed on Dec. 28, 2021.

(30) Foreign Application Priority Data

Dec. 21, 2021 (CN) ......................... 202111568219.8

(51) Int. Cl.
*G09G 3/32* (2016.01)
*G09G 3/3233* (2016.01)

(52) U.S. Cl.
CPC ....... *G09G 3/32* (2013.01); *G09G 2320/0233* (2013.01); *G09G 2330/021* (2013.01)

(58) Field of Classification Search
CPC .............................................. G09G 2320/0233
See application file for complete search history.

(56) References Cited

U.S. PATENT DOCUMENTS 6,618,031 B1 * 9/2003 Bohn, Jr. ................. G09G 3/20 345/82
10,535,306 B2 * 1/2020 Yang .................... G09G 3/3233
(Continued)

FOREIGN PATENT DOCUMENTS

CN 101599251 A 12/2009
CN 110070803 A 7/2019
(Continued)

*Primary Examiner* — Sepehr Azari
(74) *Attorney, Agent, or Firm* — Hemisphere Law, PLLC; Zhigang Ma

(57) ABSTRACT

A compensation circuit and a driving circuit of light-emitting elements, and a light-emitting diode (LED) display device are provided. In the compensation circuit, a first compensation switching device is disposed between a first pixel unit and a second pixel unit, and a second compensation switching device is disposed between a second pixel unit and a third pixel unit. When the first compensation switching device is turned on, the first pixel unit is electrically connected to the second pixel unit to provide compensation current to the second pixel unit. When the second compensation switching device is turned on, the third pixel unit is electrically connected to the second pixel unit to provide compensation current to the second pixel unit. Through the compensation circuit, the second pixel unit can be ensured to have a larger operating current range and emit higher luminous intensity, and power consumption of switching elements is reduced.

20 Claims, 2 Drawing Sheets

(56) References Cited

U.S. PATENT DOCUMENTS

| | | | | |
|---|---|---|---|---|
| 11,764,340 | B2 * | 9/2023 | Chiang | H01L 33/505<br>257/79 |
| 2014/0362071 | A1 * | 12/2014 | Jung | H05B 45/44<br>345/82 |
| 2015/0154933 | A1 | 6/2015 | Bae et al. | |
| 2015/0294616 | A1 * | 10/2015 | Jang | G09G 3/3283<br>345/691 |
| 2016/0066381 | A1 * | 3/2016 | Despesse | H05B 45/397<br>315/191 |
| 2016/0353534 | A1 * | 12/2016 | Pan | H05B 45/48 |
| 2017/0135171 | A1 * | 5/2017 | Jung | H05B 45/48 |
| 2017/0345371 | A1 * | 11/2017 | Son | G09G 3/3258 |
| 2019/0327809 | A1 * | 10/2019 | Watsuda | H03K 19/20 |
| 2020/0202786 | A1 | 6/2020 | Li et al. | |
| 2021/0029797 | A1 * | 1/2021 | Huang | H05B 45/20 |
| 2021/0225285 | A1 * | 7/2021 | Feng | G09G 3/3233 |
| 2021/0358388 | A1 * | 11/2021 | Zhang | G09G 3/3233 |
| 2024/0099058 | A1 * | 3/2024 | Choi | G09G 3/32 |

FOREIGN PATENT DOCUMENTS

| | | | |
|---|---|---|---|
| CN | 111369931 | A | 7/2020 |
| CN | 111951728 | A | 11/2020 |

* cited by examiner

COMPENSATION CIRCUIT AND DRIVING CIRCUIT OF LIGHT-EMITTING ELEMENTS, AND LED DISPLAY DEVICE

CROSS-REFERENCE TO RELATED APPLICATIONS

This application is a continuation of International Patent Application No. PCT/CN2021/142055, filed Dec. 28, 2021, which claims the priority of Chinese Patent Application No. 202111568219.8, filed Dec. 21, 2021, both of which are herein incorporated by reference in their entirety.

TECHNICAL FIELD

The disclosure relates to the field of semiconductor device display technologies, and more particularly to a compensation circuit of light-emitting elements, a driving circuit of light-emitting elements, and a light-emitting diode (LED) display device.

BACKGROUND

Liquid crystal display (LCD)/organic light-emitting diode (OLED) display backplanes and display panels with micro light-emitting diode (micro-LED) elements both adopt thin-film transistor (TFT) elements as switching devices to change the voltage/current of light-emitting devices, control the luminous uniformity of the light-emitting devices, form three primary colors of light source as seen by human eyes, and then form different colors of light and pictures of various display screens. The TFT elements determine a value of input current by adjusting a channel size of electron flow of semiconductor materials in TFT. When the light-emitting elements are connected to the TFT elements in series, the input current of the light-emitting elements can be defined by the TFT elements.

In the micro-LED elements, initial voltages of red, green, and blue (RGB) chips are usually $V_R<V_B=V_G$, that is, the initial voltage of the R chip is less than that of the B chip and the G chip. When the R, G and B chips are electrically connected in parallel, an external voltage/current is applied, and the current will only pass through the R chip, making the R chip light up, while the B and G chips are in a state that that cannot be driven and cannot be lighted up.

SUMMARY

In view of the defects of light-emitting diode (LED) chip driving in the related art, the disclosure provides a compensation circuit of light-emitting elements, a driving circuit of light-emitting elements, and a LED display device. In the compensation circuit of the disclosure, a first compensation switching device is disposed between a first pixel unit and a second pixel unit, and a second compensation switching device is disposed between the second pixel unit and a third pixel unit. When the first compensation switching device is turned on, the first pixel unit is electrically connected to the second pixel unit to provide a compensation current to the second pixel unit. When the second compensation switching device is turned on, the third pixel unit is electrically connected to the second pixel unit to provide a compensation current to the second pixel unit. Through the compensation circuit, the second pixel unit can be ensured to have a larger current range and emit the light with higher luminous intensity. In addition, the effective resistance value of the pixel unit can be reduced, so that the power consumption of switching elements is reduced.

According to an embodiment of the disclosure, a compensation circuit of light-emitting elements is provided, including: a first pixel unit, a second pixel unit, a third pixel unit, a first compensation switching device, and a second compensation switching device. The first compensation switching device is disposed between the first pixel unit and the second pixel unit, and configured (i.e., structured and arranged) to make the first pixel unit be electrically connected to the second pixel unit when the first compensation switching device is turned on. The second compensation switching device is disposed between the second pixel unit and the third pixel unit, and configured to make the third pixel unit be electrically connected to the second pixel unit when the second compensation switching device is turned on.

In an embodiment, the first pixel unit includes a first light-emitting element and a first switching element connected in series, the second pixel unit includes a second light-emitting element and a second switching element connected in series, and the third pixel unit includes a third light-emitting element and a third switching element connected in series.

In an embodiment, an end of the first compensation switching device is connected between the first light-emitting element and the first switching element, and the other end of the first compensation switching device is connected between the second light-emitting element and the second switching element.

In an embodiment, an end of the second compensation switching device is connected between the second light-emitting element and the second switching element, and the other end of the second compensation switching device is connected between the third light-emitting element and the third switching element.

In an embodiment, the compensation circuit further includes a timing control circuit, and the timing control circuit is configured to control the first compensation switching device and the second compensation switching device to be turned on or turned off.

In an embodiment, the timing control circuit is configured to control the first compensation switching device and the second compensation switching device to be turned on or turned off in a pulse width modulation mode.

In an embodiment, when the second pixel unit needs to be lighted, the timing control circuit controls the first compensation switching device and the second compensation switching device to turn on alternately to provide a compensation current to the second pixel unit.

In an embodiment, the first compensation switching device and the second compensation switching device are thin-film transistor (TFT) elements.

According to another embodiment of the disclosure, a driving circuit of light-emitting element is provided, including: a driving chip configured to drive the light-emitting elements to emit light; and a compensation circuit, which is the compensation circuit of the disclosure.

In an embodiment, the timing control circuit of the compensation circuit is connected to the driving chip and the first compensation switching device and the second compensation switching device of the compensation circuit.

According to still another embodiment of the disclosure, an LED display device is provided, which includes a circuit substrate and multiple light-emitting elements arranged on the circuit substrate, a driving circuit is arranged on the circuit substrate, and the driving circuit is the driving circuit of light-emitting elements of the disclosure.

In an embodiment, the LED display device further includes a power supply connected to the driving circuit to supply power to the driving chip and the compensation circuit in the driving circuit.

As described above, the compensation circuit of light-emitting elements, the driving circuit of light-emitting elements and the LED display device of the disclosure have beneficial effects as follows.

In the compensation circuit provided by the disclosure, the first compensation switching device is disposed between the first pixel unit and the second pixel unit, and the second compensation switching device is disposed between the second pixel unit and the third pixel unit. When the first compensation switching device is turned on, the first pixel unit is electrically connected to the second pixel unit to provide the compensation current to the second pixel unit. When the second compensation switching device is turned on, the third pixel unit is electrically connected to the second pixel unit to provide the compensation current to the second pixel unit. Through the compensation circuit, the second pixel unit can be ensured to have a larger operating current range and emit the light with higher luminous intensity. The driving circuit with the compensation circuit can ensure that the light-emitting elements can emit light stably and has better luminous effect.

When the first compensation switching device is turned on, variable resistors (i.e., switching elements) of the first pixel unit and the second pixel unit are connected in parallel. When the second compensation switching device is turned on, the variable resistors (i.e., switching elements) of the second pixel unit and the third pixel unit are connected in parallel. Therefore, the effective resistance value of the pixel unit can be reduced, so that the power consumption of the switching elements can be reduced.

The driving circuit of the display device of the disclosure includes the compensation circuit, and the light-emitting elements can stably emit light with higher luminous intensity, so that the display effect of the display device can be improved. In addition, since the compensation circuit can reduce the power consumption of the switching elements, the power consumption of the entire display device can also be reduced.

Figure 1:
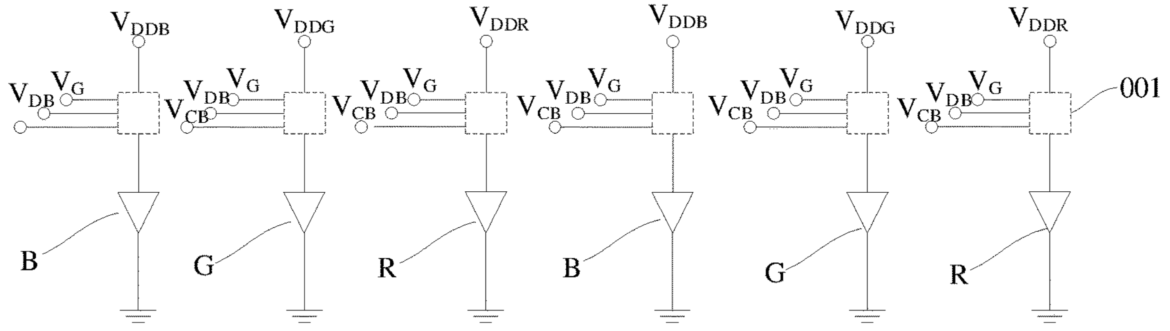
FIG. 1 (related art)
FIG. 1 illustrates a schematic structural diagram showing pixel units in a display module in the related art.

Description of reference signs are as follows:

001 switching element
100 pixel unit
100-1 variable resistor
100-2 fixed resistor
101 first pixel unit
101-1 first switching element
101-2 first light-emitting element
101-3 first compensation switching device
102 second pixel unit
102-2 second light-emitting element
102-3 second compensation switching device
103 third pixel unit
103-1 third switching element
103-2 third light-emitting element
103-3 third compensation switching device
104 first current pulse
204 second current pulse
304 third current pulse
102-1 second switching element
400 display device
401 cover
402 circuit substrate.
205 compensation current
403 light-emitting element
404 bottom shell

DETAILED DESCRIPTION OF EMBODIMENTS

Embodiments of the disclosure are described below through specific examples, and those skilled in the art can easily understand other advantages and effects of the disclosure from the contents disclosed in the specification. The disclosure may also be implemented or applied by other different specific embodiments, and various details in the specification may be modified or changed based on different viewpoints and applications without departing from the spirit of the disclosure.

In a micro light-emitting diode (micro-LED) display panel, a thin-film transistor (TFT) element as a switching element is connected in series to a light-emitting element, and an input current of the light-emitting element can be defined by the TFT element. As shown in FIG. 1, generally speaking, an electron flow channel of the switching element 001 can be adjusted by voltages Vgate, Vdata, and Vcomplementrary input to the TFT element, and $V_{DD}$ is a two-terminal voltage with variable voltage values input from the outside to the TFT element. In micro-LED elements, initial voltages of red, green, and blue (RGB) chips are usually $V_R<V_B=V_G$, that is, the initial voltage of the red (R) chip is less than that of the blue (B) chip and the green (G) chip. When the R, G and B chips are electrically connected in parallel, an external voltage/current is applied, and the current will only pass through the R chip, making the R chip be lighted up, while the B and G chips are in a state that that cannot be driven and cannot be lighted up. Therefore, in the same adjustable current range of the switching elements, there will be the problem of insufficient brightness of the R chip. In this situation, in the series circuit, the resistance of the individual switching element is relatively large, resulting in increased power consumption of the device.

Embodiment 1

Figure 2:
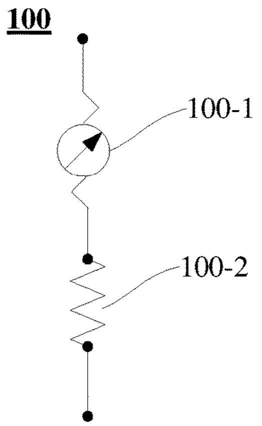
FIG. 2 illustrates an equivalent circuit diagram of pixel units in a compensation circuit of light-emitting elements according to a first embodiment of the disclosure.

In view of the above-mentioned defects in the related art, this embodiment provides a compensation circuit of light-emitting elements. In basic circuitry, an element composed of a TFT element can be assumed as a variable resistor. However, a light-emitting element is for example a light-emitting element of the micro-LED chip with fast response in the time domain, a current/voltage is applied to the micro-LED chip, and the micro-LED chip may be regarded as an element similar to a fixed resistor. Accordingly, as shown in FIG. 2, a light-emitting element and a switching element connected in series in a display device may be regarded as a variable resistor 100-1 and a fixed resistor 100-2 connected in series. A light-emitting element and a variable resistor form a pixel unit 100 on a display screen. Each light-emitting device can only be supplied with current by a set of switching elements, so that the luminous intensity of the light-emitting elements is related to the current intensity provided by the switching elements.

Figure 3:
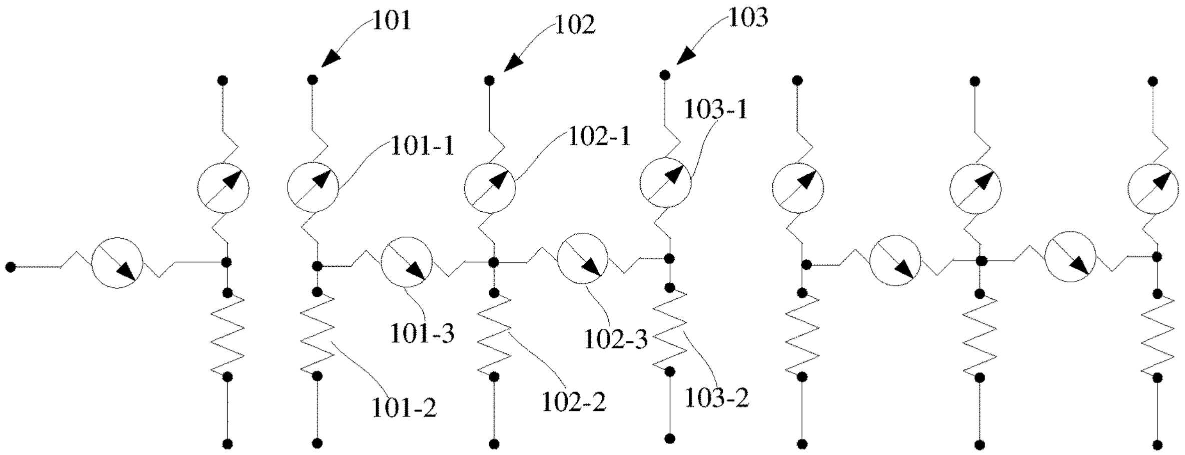
FIG. 3 illustrates a schematic diagram of the compensation circuit of light-emitting elements according to the first embodiment of the disclosure.

As shown in FIG. 3, in this embodiment, the compensation circuit of light-emitting elements includes a first pixel unit 101, a second pixel unit 102, a third pixel unit 103, a first compensation switching device 101-3 and a second compensation switching device 102-3. The first pixel unit 101 includes a first switching element 101-1 and a first light-emitting element 101-2 connected in series, the second pixel unit 102 includes a second switching element 102-1 and a second light-emitting element 102-2 connected in series, and the third pixel unit 103 includes a third switching element 103-1 and a third light-emitting element 103-2 connected in series. The first switching element 101-1, the second switching element 102-1 and the third switching element 103-1 are TFT elements. The first light-emitting element 101-2, the second light-emitting element 102-2 and the third light-emitting element 103-2 are all LED chips, in some embodiments, they all are micro-LED chips. In an alternative embodiment, the first light-emitting element 101-2 is a green LED chip, the second light-emitting element 102-2 is a red LED chip, and the third light-emitting element 103-2 is a blue LED chip.

Referring to FIG. 3, the first compensation switching device 101-3 is disposed between the first pixel unit 101 and the second pixel unit 102. Specifically, one end of the first compensation switching device 101-3 is connected between the first switching element 101-1 and the first light-emitting element 101-2 of the first pixel unit 101, and the other end of the first compensation switching device 101-3 is connected between the second switching element 102-1 and the second light-emitting element 102-2 of the second pixel unit 102. When the first compensation switching device 101-3 is turned on, the first pixel unit 101 and the second pixel unit 102 are electrically connected. At this time, when a current/voltage is supplied to the pixel unit, the first pixel unit 101 can supply current to the second pixel unit 102 through the first compensation switching device 101-3, so that the second light-emitting element 102-2 of the second pixel unit 102 has a higher luminous intensity and a brighter brightness.

Referring to FIG. 3, the second compensation switching device 102-3 is disposed between the second pixel unit 102 and the third pixel unit 103. Specifically, one end of the second compensation switching device 102-3 is connected between the second switching element 102-1 and the second light-emitting element 102-2 of the second pixel unit 102, and the other end of the second compensation switching device 102-3 is connected between the third switching element 103-1 and the third light-emitting element 103-2 of the third pixel unit 103. When the second compensation switching device 102-3 is turned on, the second pixel unit 102 and the third pixel unit 103 are electrically connected. At this time, when a current/voltage is supplied to the pixel unit, the third pixel unit 103 can supply current to the second pixel unit 102 through the second compensation switching device 102-3, so that the second light-emitting element 102-2 of the second pixel unit 102 has a higher luminous intensity and a brighter brightness. When the first compensation switching device 101-3 and the second compensation switching device 102-3 are turned off, the second pixel unit 102 displays normally at an original current/voltage.

As mentioned above, by arranging the first compensation switching device and the second compensation switching device, the light-emitting element of the second pixel unit can have a larger operating current range, so that the light-emitting element can emit light with higher luminous intensity and different intensities, and particularly, the current compensation device can emit brighter brightness. In addition, as shown in FIG. 3, when at least one of the first compensation switching device and the second compensation switching device is turned on, the variable resistors (i.e., the first switching element and the second switching element) of the first pixel and the second pixel are connected in parallel, or the variable resistors (i.e., the second switching element and the third switching element) of the second pixel and the third pixel are connected in parallel, the parallel connection of the resistors reduces the effective resistance value of the pixel unit, thereby reducing the power consumption of the switching elements during the turn-on period of the compensation switching device.

Figure 4:
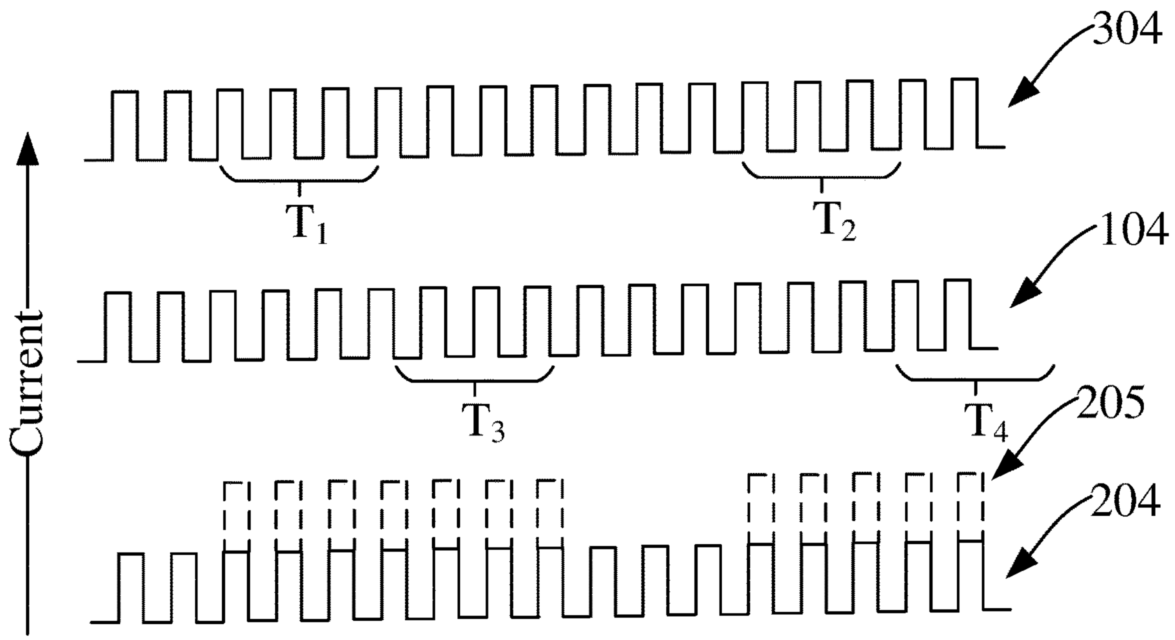
FIG. 4 illustrates a schematic diagram of current pulses applied to the pixel units.

In an alternative embodiment, the compensation circuit further includes a timing control circuit, and the timing control circuit controls the on and off timing of the above-described first compensation switching device and the second compensation switching device according to a certain timing control mode. In an embodiment, the timing control circuit controls the first compensation switching device and the second compensation switching device to be turned on or turned off in a pulse width modulation mode. As shown in FIG. 4, current pulses applied to different pixel units in this embodiment are shown. The first current pulse 104 is a current pulse applied to the first pixel unit 101, the second current pulse 204 is a current pulse applied to the second pixel unit 102, and the third current pulse 304 is a current pulse applied to the third pixel unit 103. During periods $T_1$ and $T_2$, the second compensation switching device 102-3 is turned on, and the third current pulse 304 provides compensation current to the second pixel unit 102. During periods $T_3$ and $T_4$, the first compensation switching device 101-3 is turned on, the first current pulse 104 provides compensation current to the second pixel unit 102 at this time. Finally, the second pixel unit 102 obtains the compensation current 205 shown in FIG. 4. The compensation current 205 is superimposed with the second current pulse, so that the second light-emitting element 102-2 of the second pixel unit 102 has stronger current intensity during the periods $T_1$, $T_2$, $T_3$ and $T_4$, and thus can have a stronger luminous intensity and a brighter brightness.

Embodiment 2

Figure 5:
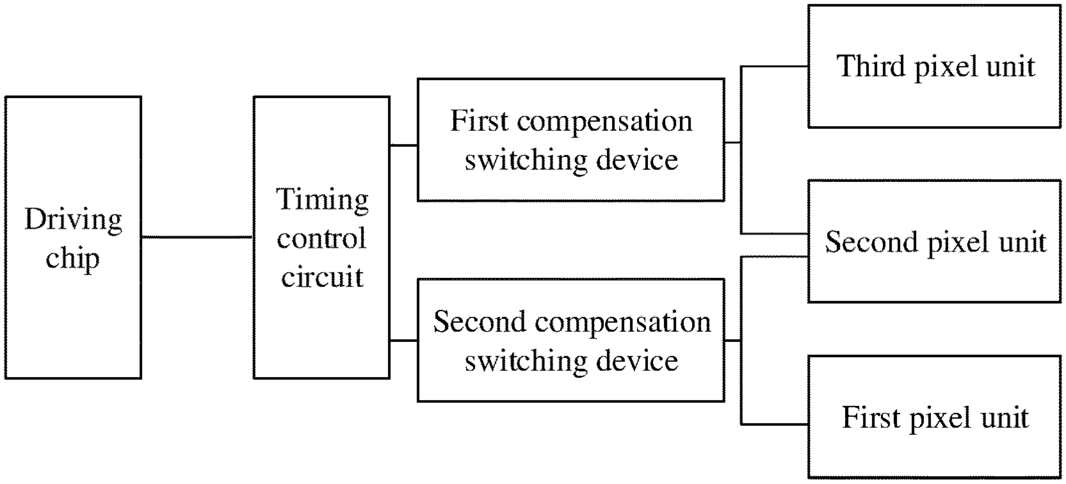
FIG. 5 illustrates a schematic diagram of a driving circuit according to a second embodiment of the disclosure.

This embodiment provides a driving circuit of light-emitting elements, which includes a driving chip and a compensation circuit. As shown in FIG. 5, a timing control circuit of the compensation circuit is connected to the driving chip, a first compensation switch device and a second compensation switch device of the compensation circuit, thereby realizing the connection between the compensation circuit and the driving chip. When the current/voltage is applied to a pixel unit, the driving chip receives a signal to drive a light-emitting element in the pixel unit to emit light, and the timing control circuit controls the first compensation switching device and the second compensation switching device to be turned on and turned off according to the timing mode shown in FIG. 4, thus realizing the current compensation for a second pixel unit to thereby make the second pixel unit emit stronger light.

In the driving circuit of this embodiment, control terminals of a first switching element, a second switching element and a third switching element are applied with the same control voltage, for example, the control terminals of the first switching element, the second switching element and the third switching element are connected together and controlled by a sensing control line SG. Each pixel unit is connected to a driving chip, and the driving chip is configured to drive the light-emitting element to emit light according to a data voltage. Taking the first pixel unit, the second pixel unit and the third pixel unit as examples, the first pixel unit includes a first driving chip, and the first driving chip is connected to the first light-emitting element; the second pixel unit includes a second driving chip, and the second driving chip is connected to the second light-emitting element; and the third pixel unit includes a third driving chip, and the third driving chip is connected to the third light-emitting element. In addition, the first switching element is connected in series to output terminals of the first driving chip and the second driving chip, the second switching element is connected in series to the output terminals of the second driving chip and the third driving chip, and the output terminal of the third driving chip is connected to a sensing line SL of the driving circuit via the third switching element. The first, second and third driving chips are connected to a data line DL, and drive the first, second and third light-emitting elements to emit light according to the driving current generated by the data voltage on the data line. The sensing line SL is used to sense the output of the driving chips and obtain the value of the driving current according to the change of the voltage of the sensing line within a predetermined time. The timing control circuit in the compensation circuit obtains a value of the driving current, and controls the first compensation switching device and the second compensation switching device to be turned on and turned off in a pulse width control mode according to the determined value of the driving current.

Referring to FIG. 4, during the period $T_1$ to $T_4$, it is detected that the current flowing through the second pixel unit is small, and it is necessary to compensate the current for the second pixel unit. During the periods $T_1$ and $T_2$, the timing control circuit controls the second compensation switching device 102-3 to be turned on, and the third current pulse 304 provides compensation current to the second pixel unit 102, so that the brightness of the second light-emitting element 102-2 is improved. During the periods $T_3$ and $T_4$, the first compensation switching device 101-3 is turned on, and at this time, the first current pulse 104 provides compensation current to the second pixel unit 102, so that the brightness of the second light-emitting element 102-2 is improved. Finally, the second pixel unit 102 obtains the compensation current 205 shown in FIG. 4. The compensation current 205 is superimposed with the second current pulse, so that the second light-emitting element 102-2 of the second pixel unit 102 has stronger current intensity during the time periods $T_1$, $T_2$, $T_3$ and $T_4$, so it can have stronger luminous intensity and brighter brightness. Therefore, the second light-emitting element has a larger current adjustment range and can meet different brightness requirements.

Embodiment 3

Figure 6:
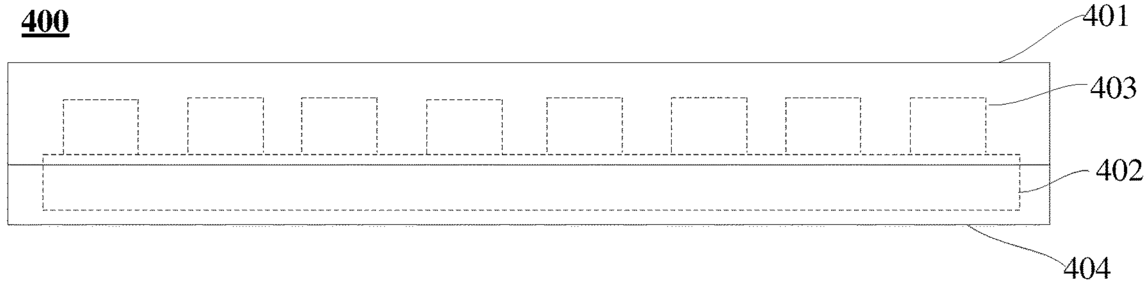
FIG. 6 illustrates a schematic structural diagram of a light-emitting diode (LED) display device according to a third embodiment of the disclosure.

This embodiment provides a LED display device. As shown in FIG. 6, the display device 400 includes a cover 401 and a bottom shell 404, and the cover 401 and the bottom shell 404 may be fixed to each other by means of buckles, positioning pins and positioning holes, so as to form a cavity between the cover 401 and the bottom shell 404. The cavity can accommodate a circuit substrate 402 and light-emitting elements 403 located on the circuit substrate.

In the display device 400, the above-mentioned light-emitting elements may include light-emitting elements capable of emitting different colors, for example, the green LED chip as the first light-emitting element 101-2, the red LED chip as the second light-emitting element 102-2 and the blue LED chip as the third light-emitting element 103-2 as described in the first embodiment. The circuit substrate 402 is provided with a circuit layer, which may be a TFT substrate or a printed circuit board (PCB) substrate. Taking the TFT substrate as an example, the TFT substrate includes a switching element connected in series to each light-emitting element, and one switching element and one light-emitting element constitute one pixel unit of the display device 400. The TFT substrate further includes the first compensation switching device connected between the first pixel unit and the second pixel unit, and the second compensation switching device connected between the second pixel unit and the third pixel unit. A circuit layer connecting the pixel units and the first and second compensation switching devices is also arranged in the TFT substrate, and the pixel units and the first and second compensation switching devices are connected to external voltage/current through the circuit layer. The display device is also disposed with a power supply, and the circuit layer is connected to the power supply, and in this situation, the power supply is disposed with a terminal connected to an external power supply, and the circuit layer of the circuit board is electrically connected to the external power supply through the power supply.

In addition, the circuit substrate 402 further includes a driving chip arranged thereon, and the driving chip is connected to the pixel unit to drive the light-emitting elements in the pixel unit to emit light. Correspondingly, the circuit layer of the circuit board further includes a driving line connected to the driving chip, which realizes the connection between the driving chip and the external driving signal. In addition, the circuit layer of the circuit substrate 402 further includes a timing control circuit connected to the driving chip and the first compensation switching device and the second compensation switching device of the compensation circuit to realize the connection between the compensation circuit and the driving chip. When the current/voltage is applied to the pixel unit, the driving chip receives the signal to drive the light-emitting element in the pixel unit to emit light, and the timing control circuit controls the first compensation switching device and the second compensation switching device to be turned on and turned off according to the timing mode shown in FIG. 4, so as to compensate the current of the second pixel unit during the compensation period, so that the second pixel unit emits stronger light.

As mentioned above, the display device of this embodiment includes the compensation circuit and the driving circuit described in the embodiment 1 and the embodiment 2, so that the red LED chip has a larger operating current space, and can emit different intensities of brightness as required, so as to meet different display requirements and achieve better display effect.

The above-described embodiments are merely illustrative of the principle and efficacy of the disclosure, and are not intended to limit the disclosure. Any person skilled in the art may modify or change the above embodiments without violating the spirit and scope of the disclosure. Therefore, all equivalent modifications or changes made by those skilled in the art without departing from the spirit and technical ideas disclosed in the disclosure shall still be covered by the claims of the disclosure.

What is claimed is:

1. A compensation circuit of light-emitting elements, comprising: a first pixel unit, a second pixel unit, and a third pixel unit connected in parallel; a first compensation switching device, disposed between the first pixel unit and the second pixel unit, and configured to make the first pixel unit be electrically connected to the second pixel unit when the first compensation switching device is turned on; and a second compensation switching device, disposed between the second pixel unit and the third pixel unit, and configured to make the third pixel unit be electrically connected to the second pixel unit when the second compensation switching device is turned on; wherein the first compensation switching device and the second compensation switching device are connected in series.

2. The compensation circuit according to claim 1, wherein the first pixel unit comprises a first light-emitting element and a first switching element connected in series, the second pixel unit comprises a second light-emitting element and a second switching element connected in series, and the third pixel unit comprises a third light-emitting element and a third switching element connected in series.

3. The compensation circuit according to claim 2, wherein an end of the first compensation switching device is connected between the first light-emitting element and the first switching element, and another end of the first compensation switching device is connected between the second light-emitting element and the second switching element.

4. The compensation circuit according to claim 2, wherein an end of the second compensation switching device is connected between the second light-emitting element and the second switching element, and another end of the second compensation switching device is connected between the third light-emitting element and the third switching element.

5. The compensation circuit according to claim 1, further comprising: a timing control circuit configured to control the first compensation switching device and the second compensation switching device to be turned on or turned off.

6. The compensation circuit according to claim 5, wherein the timing control circuit is configured to control the first compensation switching device and the second compensation switching device to be turned on or turned off in a pulse width modulation mode.

7. The compensation circuit according to claim 5, wherein when the second pixel unit needs to be lighted, the timing control circuit is configured to control the first compensation switching device and the second compensation switching device to be turned on alternately to provide a compensation current to the second pixel unit.

8. The compensation circuit according to claim 1, wherein the first compensation switching device and the second compensation switching device are thin-film transistor (TFT) elements.

9. A driving circuit of light-emitting elements, comprising: a driving chip, configured to drive the light-emitting elements to emit light; and a compensation circuit, comprising: a first pixel unit, a second pixel unit and a third pixel unit connected in parallel; a first compensation switching device, disposed between the first pixel unit and the second pixel unit, and configured to make the first pixel unit be electrically connected to the second pixel unit when the first compensation switching device is turned on; and a second compensation switching device, disposed between the second pixel unit and the third pixel unit, and configured to make the third pixel unit be electrically connected to the second pixel unit when the second compensation switching device is turned on; wherein the first compensation switching device and the second compensation switching device are connected in series.

10. The driving circuit according to claim 9, wherein the first pixel unit comprises a first light-emitting element and a first switching element connected in series; and an end of the first compensation switching device is connected between the first light-emitting element and the first switching element, and another end of the first compensation switching device is connected with the second pixel unit.

11. The driving circuit according to claim 10, wherein the second pixel unit comprises a second light-emitting element and a second switching element connected in series; and another end of the first compensation switching device is connected between the second light-emitting element and the second switching element.

12. The driving circuit according to claim 11, wherein the third pixel unit comprises a third light-emitting element and a third switching element connected in series; and an end of the second compensation switching device is connected between the second light-emitting element and the second switching element, and another end of the second compensation switching device is connected between the third light-emitting element and the third switching element.

13. The driving circuit according to claim 9, wherein the compensation circuit further comprises a timing control circuit connected to the first compensation switching device and the second compensation switching device, and the timing control circuit is configured to control the first compensation switching device and the second compensation switching device to be turned on or turned off.

14. The driving circuit according to claim 13, wherein the timing control circuit is configured to control the first compensation switching device and the second compensation switching device to be turned on or turned off in a pulse width modulation mode.

15. The driving circuit according to claim 13, wherein when the second pixel unit needs to be lighted, the timing control circuit is configured to control the first compensation switching device and the second compensation switching device to be turned on alternately to provide a compensation current to the second pixel unit.

16. The driving circuit according to claim 13, wherein the timing control circuit of the compensation circuit is connected to the driving chip, and the timing control circuit is configured to obtain a value of the driving current of the driving chip, and control, based on the value of the driving current of the driving chip, the first compensation switching device and the second compensation switching device to be turned on and turned off in a pulse width control mode.

17. The driving circuit according to claim 9, wherein the first compensation switching device and the second compensation switching device are TFT elements.

18. A light-emitting diode (LED) display device, comprising a circuit substrate and a plurality of light-emitting elements arranged on the circuit substrate, wherein a driving circuit is disposed on the circuit substrate, and the driving circuit comprises: a driving chip, configured to drive the plurality of light-emitting elements to emit light; and a compensation circuit, comprising: a first pixel unit, a second pixel unit and a third pixel unit connected in parallel; a first compensation switching device, disposed between the first pixel unit and the second pixel unit, and configured to make the first pixel unit be electrically connected to the second pixel unit when the first compensation switching device is turned on; and a second compensation switching device, disposed between the second pixel unit and the third pixel unit, and configured to make the third pixel unit be electrically connected to the second pixel unit when the second compensation switching device is turned on; wherein the first compensation switching device and the second compensation switching device are connected in series.

19. The LED display device according to claim 18, further comprising: a power supply connected to the driving circuit to supply power to the driving chip and the compensation circuit of the driving circuit.

20. The LED display device according to claim 18, further comprising: a cover and a bottom shell fixed to each other, wherein a cavity is defined between the cover and the bottom shell to accommodate the circuit substrate and the plurality of light-emitting elements arranged on the circuit substrate.

* * * * *